United States Patent
Groot et al.

(10) Patent No.: US 6,597,460 B2
(45) Date of Patent: Jul. 22, 2003

(54) HEIGHT SCANNING INTERFEROMETER FOR DETERMINING THE ABSOLUTE POSITION AND SURFACE PROFILE OF AN OBJECT WITH RESPECT TO A DATUM

(75) Inventors: Peter De Groot, Middletown, CT (US); Xavier Colonna De Lega, Middletown, CT (US); Leslie L. Deck, Middletown, CT (US); James W. Kramer, Waterford, CT (US)

(73) Assignee: Zygo Corporation, Middlefield, CT (US)

( * ) Notice: Subject to any disclaimer, the term of this patent is extended or adjusted under 35 U.S.C. 154(b) by 308 days.

(21) Appl. No.: 09/769,891

(22) Filed: Jan. 25, 2001

(65) Prior Publication Data

US 2001/0050773 A1 Dec. 13, 2001

Related U.S. Application Data

(60) Provisional application No. 60/205,736, filed on May 19, 2000.

(51) Int. Cl.[7] ................................................. G01B 9/02
(52) U.S. Cl. ...................................... 356/512; 356/497
(58) Field of Search ............................... 356/497, 511, 356/512, FOR 119, FOR 120

(56) References Cited

U.S. PATENT DOCUMENTS

| 5,384,717 A | | 1/1995 | Ebenstein |
| 5,390,023 A | * | 2/1995 | Biegen ........................ 356/497 |
| 5,398,113 A | | 3/1995 | de Groot |
| 5,471,303 A | | 11/1995 | Ai et al. |
| 5,953,124 A | | 9/1999 | Deck |
| 6,028,670 A | | 2/2000 | Deck |

FOREIGN PATENT DOCUMENTS

| JP | 2000121317 | 4/2000 |
| WO | WO 93/24805 | 12/1993 |
| WO | WO 95/09343 | 4/1995 |

OTHER PUBLICATIONS

Biegen, "Determination of the Phase Change on Reflection from Two–beam Interference," *Optics Letters*, 19:21:1690–1692, Nov. 1, 1994.

Danielson et al., "Absolute Optical Ranging Using Low Coherence Interferometry," *Applied Optics*, 30:21:2975–2979, Jul. 20, 1991.

Kino et al., "Mirau Correlation Microscope," *Applied Optics*, 29:26:3775–3783, Sep. 10, 1990.

Park et al., "Direct Quadratic Polynomial Fitting for Fringe Peak Detection of White Light Scanning Interferograms," *Opt. Eng.*, 39:4:952–959, Apr. 2000.

Dresel et al., "Three Dimensional Sensing of Rough Surfaces by Coherence Radar, "*Applied Optics*, 31:7:919–925, Mar. 1, 1992.

Larkin, "Efficient Nonlinear Algorithm for Envelope Detection in White Light Interferometry," *J.Opt. Soc. Am. A*, 13:4:832–943 (1996).

* cited by examiner

Primary Examiner—Samuel A. Turner
Assistant Examiner—Patrick J Connolly
(74) Attorney, Agent, or Firm—Fish & Richardson P.C.

(57) ABSTRACT

The invention features a surface profiling method including: collecting interferometric data related to a surface profile of a measurement object; and calculating the surface profile based on the collected interferometric data and at least one value indicative of dispersion in the phase change on reflection (PCOR) of the profiled surface of the measurement object. The invention also features a surface profiling system including: an interferometry system which during operation provides interferometric data related to a surface profile of a measurement object; and an electronic processor coupled the interferometry system, wherein during operation the electronic processor calculates the surface profile based on the interferometric data and at least one parameter indicative of dispersion in the phase change on reflection (PCOR) of the profiled surface of the measurement object.

30 Claims, 6 Drawing Sheets

HEIGHT SCANNING INTERFEROMETER FOR DETERMINING THE ABSOLUTE POSITION AND SURFACE PROFILE OF AN OBJECT WITH RESPECT TO A DATUM

CROSS-REFERENCE TO RELATED APPLICATIONS

This application claims priority from U.S. provisional patent application 60/205,736, filed May 19, 2000, the contents of which is incorporated herein by reference.

BACKGROUND OF THE INVENTION

The invention relates to non-contact techniques for determining the position in space of points on an object part, including sub-micron precision height measurements of a selected part surface. Example applications are surface profiling, the determination of the height of surface features, which may include dissimilar materials, and the measurement of surface features with respect to a fixed coordinate system or datum so as to determine part location and orientation.

Various optical sensing technologies are available for measuring surface profiles. Height scanning interferometry, as referred to herein, employs broadband light sources to determine 3-D surface height profiles without the fringe-order ambiguity normally associated with laser-based interferometry. In the visible, this height scanning is often referred to in the art as scanning white light interferometry (SWLI), coherence radar, correlation microscopy and vertical scanning interferometry.

SUMMARY OF THE INVENTION

The invention features methods and systems that extend the basic technique of height scanning interferometry by compensating for the phase change on reflection (PCOR) caused by the interferometer and the object part being measured, including the wavelength dependence (dispersion) of PCOR. Proper compensation of such effects improves the accuracy of scanning height measurements. For example, object parts having regions with different optical properties can be more accurately characterized.

Also, the invention extends height-scanning interferometry to those metrology problems for which the absolute position and orientation of the surface is as important as the surface texture and profile. Thus, in addition to providing the form and texture of the surface, the overall position (piston), tip and tilt of the object part can be determined with respect to a fixed point or plane of reference when constructing the surface profile.

In general, in one aspect, the invention features a surface profiling method for determining the relative positions of multiple points on an object surface including multiple surface materials. The method includes: collecting interferometric data related to the relative positions; and calculating the relative positions based on the collected interferometric data and at least one value indicative of dispersion in the phase change on reflection (PCOR) for each of the surface materials.

In general, in another aspect, the invention features a surface profiling method for determining the relative positions of multiple points on an object surface including multiple surface materials. The method includes: collecting interferometric data related to the relative positions; and calculating the relative positions based on the collected interferometric data and at least one value indicative of the phase change on reflection (PCOR) $\gamma_{part}$ for each of the surface materials.

In general, in another aspect, the invention features a surface profiling method for determining the absolute position with respect to a common datum surface of each of multiple points on an object surface. The method includes: collecting interferometric data related to the absolute positions; and calculating the absolute positions based on the collected interferometric data and at least one value indicative of dispersion in the phase change on reflection (PCOR) of the object surface and dispersion in the phase change on reflection (PCOR) of an interferometry system used to collect the interferometric data.

In general, in another aspect, the invention features a surface profiling method for determining the absolute position with respect to a common datum surface of each of multiple points on an object surface. The method includes: collecting interferometric data related to the absolute positions; and calculating the absolute positions based on the collected interferometric data and at least one value indicative of the phase change on reflection (PCOR) of the object surface $\gamma_{part}$ and the phase change on reflection (PCOR) of an interferometry system used to collect the interferometric data $\gamma_{sys}$.

In general, in another aspect, the invention features a surface profiling method including: collecting interferometric data related to a surface profile of a measurement object; and calculating the surface profile based on the collected interferometric data and at least one value indicative of dispersion in the phase change on reflection (PCOR) of the profiled surface of the measurement object.

Embodiments of this aspect of the invention can include any of the following features.

The calculation of the surface profile can be based on the collected interferometric data and multiple values indicative of dispersion in the phase change on reflection (PCOR) of different regions of the profiled surface of the measurement object.

The calculation of the surface profile can be based on the collected interferometric data and at least one value indicative of dispersion in the phase change on reflection (PCOR) of the profiled surface of the measurement object and dispersion in the phase change on reflection (PCOR) of an interferometry system used to collect the interferometric data.

The collection of interferometric data can include collecting scanning interferometric data related to the surface profile of the measurement object.

The collected interferometric data can include at least one phase value ø(k) at a wavevector k for each of multiple points on the profiled surface, and wherein the calculation of the surface profile is based on the relationship $$\phi(k)=2nk(h-\zeta)+(\gamma_{part}+\gamma_{sys})+(\tau_{part}+\tau_{sys})(k-k_0)$$

where h is the surface height, $\zeta$ is a reference offset position, n is a refractive index, $\gamma_{part}$ is the phase change on reflection (PCOR) of the profiled surface at the wavevector k, $\gamma_{sys}$ is the phase change on reflection (PCOR) of an interferometry system used to collect the interferometric data at the wavevector k, $\tau_{part}$ is the linear dispersion of the phase change on reflection (PCOR) of the profiled surface with respect to a reference wavevector $k_0$, and $\tau_{sys}$ is the linear dispersion of the phase change on reflection (PCOR) of the interferometer system with respect to wavevector $k_0$.

The collected interferometric data can include multiple phase values ø(k) corresponding to multiple wavevector values k for each of multiple points on the profiled surface, and wherein the calculation of the surface profile is based on the relationship $$\frac{\partial \phi(k)}{\partial k} = 2n(h-\zeta) + (\tau_{part} + \tau_{sys})$$

where h is the surface height, $\zeta$ is a reference offset position, n is a refractive index, $\tau_{part}$ is the linear dispersion of the phase change on reflection (PCOR) of the profiled surface with respect to a reference wavevector $k_0$, and $\tau_{sys}$ is the linear dispersion of the phase change on reflection (PCOR) of an interferometry system used to collect the interferometric data with respect to the reference wavevector $k_0$.

The interferometric data can be scanning interferometric data including multiple phase values $\phi(\zeta)$ corresponding to multiple positions $\zeta$ of a scanning reference mirror for each of multiple points on the profiled surface, and the calculation of the surface profile includes transforming the multiple phase values for each point into a wavevector domain, calculating a derivative of the transformed phase values for each point with respect to wavevector, and calculating the surface profile from the derivative for each point and the at least one value indicative of dispersion in the phase change on reflection (PCOR) of the profiled surface of the measurement object.

In such embodiments, the at least one value can be indicative of the dispersion in the phase change on reflection (PCOR) of the profiled surface of the measurement object and the dispersion in the phase change on reflection (PCOR) of a scanning interferometry system used to collect the interferometric data, and the calculated surface profile provides an absolute position with respect to a common datum surface for each of the multiple points on the profiled surface. he interferometric data includes coherence profiling data and phase profiling data, and wherein the calculation of the surface profile includes using the coherence profiling data and the at least one value indicative of the dispersion in the phase change on reflection (PCOR) to determine an initial estimate of the surface profile, and using the initial estimate to resolve fringe ambiguity in the phase profiling data.

The at least one value can be $\tau_{part}+\tau_{sys}$, where $\tau_{part}$ is the linear dispersion of the phase change on reflection (PCOR) of the profiled surface with respect to a reference wavevector $k_0$, and $\tau_{sys}$ is the linear dispersion of the phase change on reflection (PCOR) of an interferometry system used to collect the interferometric data with respect to the reference wavevector $k_0$.

The at least one value can include $\tau_{part}$ and $\tau_{sys}$, where $\tau_{part}$ is the linear dispersion of the phase change on reflection (PCOR) of the profiled surface with respect to a reference wavevector $k_0$, and $\tau_{sys}$ is the linear dispersion of the phase change on reflection (PCOR) of an interferometry system used to collect the interferometric data with respect to the reference wavevector $k_0$.

In such embodiments, the at least one value can further include $\gamma_{part}$ and $\gamma_{sys}$, where $\gamma_{part}$ is the phase change on reflection (PCOR) of the profiled surface at a particular wavevector k, and $\gamma_{sys}$ is the phase change on reflection (PCOR) of the interferometry system at the wavevector k.

The at least one value can include a first value indicative of the dispersion in the phase change on reflection (PCOR) of the profiled surface and a second value indicative of a phase change on reflection (PCOR) of the profiled surface for a particular wavevector k.

The calculated surface profile can provide an absolute position with respect to a common datum surface of each of multiple points on the profiled surface.

The collected interferometric data can include coherence profiling intensity data as a function of a reference mirror scan position $\zeta$, wherein the calculation of the surface profile is based on the relationship $$h=\zeta_{max}-(\tau_{sys}-\tau_{part})/2n$$

where h is the surface height, $\zeta_{max}$ is the reference scan position where the intensity data is maximized, n is a refractive index, $\tau_{part}$ is the linear dispersion of the phase change on reflection (PCOR) of the profiled surface with respect to a reference wavevector $k_0$, and $\tau_{sys}$ is the linear dispersion of the phase change on reflection (PCOR) of an interferometry system used to collect the interferometric data with respect to the reference wavevector $k_0$.

In general, in another aspect, the invention features a surface profiling system including: an interferometry system which during operation provides interferometric data related to a surface profile of a measurement object; and an electronic processor coupled the interferometry system, wherein during operation the electronic processor calculates the surface profile based on the interferometric data and at least one parameter indicative of dispersion in the phase change on reflection (PCOR) of the profiled surface of the measurement object.

Embodiments of this aspect of the invention can include any of the features described above for the surface profiling method and also any of the following features.

The at least one parameter can be indicative of dispersion in the phase change on reflection (PCOR) of the profiled surface of the measurement object and dispersion in the phase change on reflection (PCOR) of the interferometry system, and wherein the surface profile calculated by the electronic processor includes an absolute position with respect to a common datum surface of each of multiple points on the profiled surface.

The electronic processor can calculate the surface profile based on the interferometric data and parameters indicative of dispersion in the phase change on reflection (PCOR) of different surface materials of the profiled surface.

The interferometry system includes: a broadband source; a scanning interferometer which during operation directs a first wavefront derived from the source along a reference path and a second wavefront derived from the source along a measurement path contacting the measurement object, and, after the second wavefront contacts the measurement object, combines the wavefronts to produce an optical interference pattern; a detector producing the interference data in response to the optical interference pattern; and a scanning controller coupled to the interferometer and the detector, which during operation causes the scanning interferometer to vary the optical path difference between the reference and measurement paths.

In general, in another aspect, the invention features a method for calibrating an interferometry system to determine at least one of the phase change on reflection (PCOR) of the interferometry system $\gamma_{sys}$ and linear dispersion of the phase change of reflection (PCOR) of the interferometry system $\tau_{sys}$ with respect to a reference wavevector $k_0$. The calibration method includes: collecting interferometric data relating to a test surface using the interferometry system; providing independent information for the profile h of the test surface, the phase change on reflection (PCOR) of the test surface $\gamma_{part}$, and the linear dispersion of the phase change on reflection (PCOR) of the test surface $\tau_{part}$ with respect to a reference wavevector $k_0$; and calculating the at least one of the phase change on reflection (PCOR) of the interferometry system $\gamma_{sys}$ and the linear dispersion of the phase change of reflection (PCOR) of the interferometry system $\tau_{sys}$ based on the interferometric data and the independent information.

Embodiments of this aspect of the invention can include any of the following features.

The collected interferometric data includes at least one phase value $\phi(k)$ at a wavevector k for each of multiple points on the test surface, and wherein the calculation of the surface profile is based on the relationship $$\phi(k)=2nk(h-\zeta)+(\gamma_{part}+\gamma_{sys})+(\tau_{part}+\tau_{sys})(k-k_0)$$

where $\zeta$ is a reference offset position and n is a refractive index.

The at least one of $\gamma_{sys}$ and $\tau_{sys}$ can include $\gamma_{sys}$.

The at least one of $\gamma$ and $\tau_{sys}$ can include $\tau_{sys}$.

The at least one of $\gamma_{sys}$ and $\tau_{sys}$ can include $\gamma_{sys}$ and $\tau_{sys}$, the interferometric data can provide an experimentally observed phase gap $G_{ex}$, and the calculation of $\tau_{sys}$ is based on the relationship $$\tau_{sys}=[(\gamma_{part}+\gamma_{sys}-G_{ex})/k_0]-\tau_{part}.$$

In general, in another aspect, the invention features a method for measuring at least one of the phase change on reflection (PCOR) of test material $\gamma_{part}$ and linear dispersion of the phase change of reflection (PCOR) of the test material $\tau_{part}$ with respect to a reference wavevector $k_0$. The method includes: collecting interferometric data relating to a test surface using an interferometry system; providing independent information for the phase change on reflection (PCOR) of the interferometry system $\gamma_{sys}$ and the linear dispersion of the phase change on reflection (PCOR) of the interferometry system $\tau_{sys}$ with respect to a reference wavevector $k_0$; and calculating the at least one of the phase change on reflection (PCOR) of the test material $\gamma_{part}$ and the linear dispersion of the phase change of reflection (PCOR) of the test material $\tau_{part}$ based on the interferometric data and the independent information. In some embodiments, the at least one of $\gamma_{part}$ and $\tau_{part}$ includes $\tau_{part}$, the interferometric data provides an experimentally observed phase gap $G_{ex}$, and the calculation of $\tau_{part}$ is based on the relationship $$\tau_{part}=[(\gamma_{part}+\gamma_{sys}-G_{ex})/k_0]-\tau_{sys}.$$

Other aspects, advantages, and features of the invention follow.

DETAILED DESCRIPTION

Figure 1:
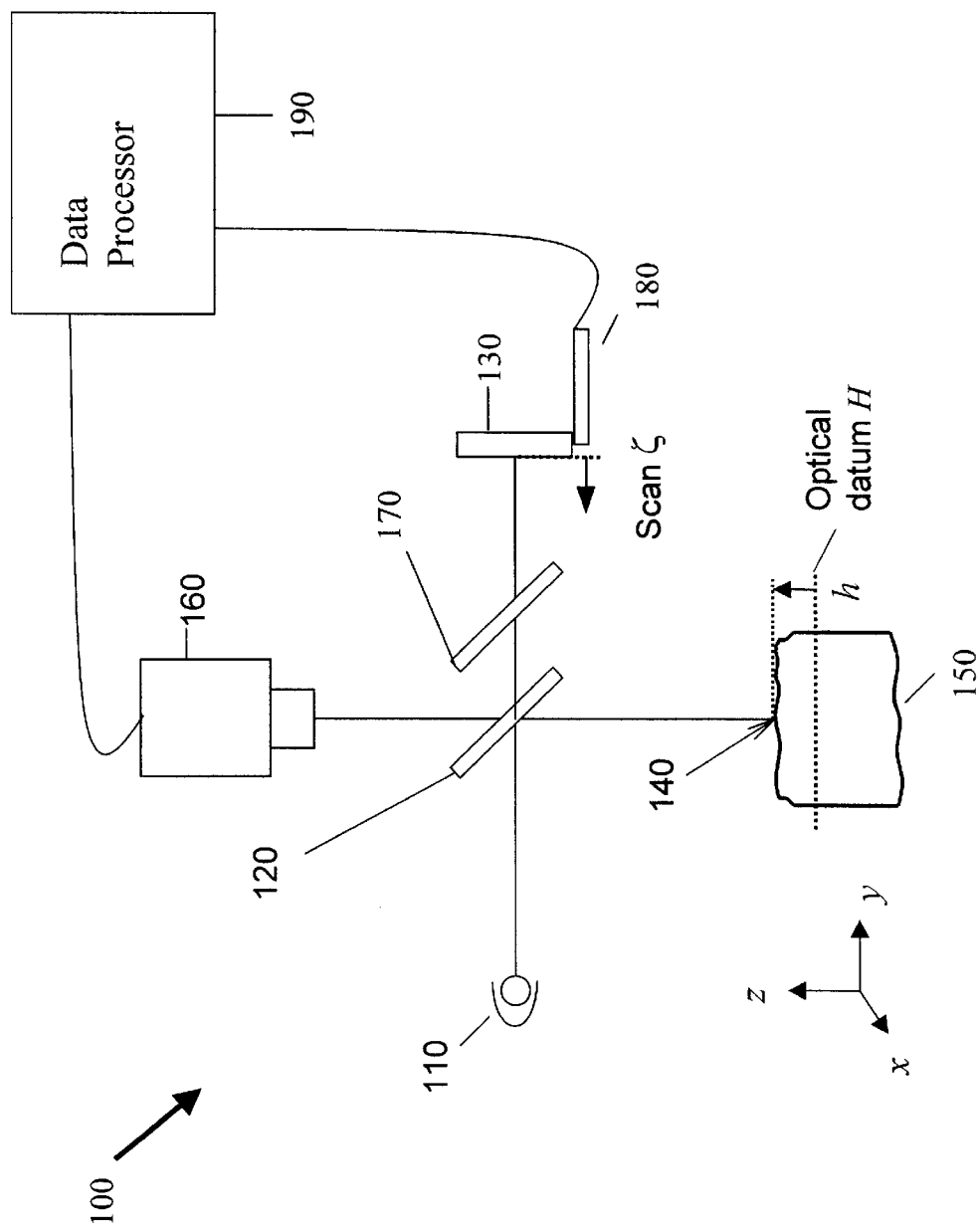
FIG. 1 is a schematic drawing of a height measuring interferometer.

The invention relates to height scanning interferometers such as the two-beam Michelson interferometer 100 shown in FIG. 1. Interferometer 100 includes a broadband light source 110, interferometer optics such as a beam splitter 120 for defining a reference path to a reference mirror 130 and a measurement path to a surface 140 of an object part 150, and a camera 160 for recording interferometric images resulting from recombining the wavefronts from the reference and measurement legs. Interferometer 100 also includes a mechanism 180 for modifying or scanning the optical paths in a controlled way such as a piezoelectric transducer coupled to reference mirror 130, and a data processor 190 coupled to camera 160 and the scanning mechanism for analyzing the interferometric data recorded by the camera. A dispersion compensation element 170 is positioned in the reference path to compensate for the path lengths for dispersion caused by the beam splitter.

Accordingly, interferometer 100 is arranged to measure a height h in the z coordinate direction at each point x, y on an object part surface using interference phase information. The virtual surface H is the optical profiler datum to which all height and interference phase measurements are referenced. To first order in the angular wavenumber $k=2\pi/\lambda$, the interference phase $\phi$ with respect to H is $$\phi(k)=2nk(h-\zeta)+(\gamma_{part}+\gamma_{sys})+(\tau_{part}+\tau_{sys})(k-k_0), \quad (1)$$

where $k_0$ is the nominal wavenumber, $\zeta$ is the reference mirror scan position, $\gamma_{part}$ is the part surface phase change on reflection (PCOR), and $\gamma_{sys}$ is the system phase offset with respect to H attributable to the interferometer system. The value $\gamma_{sys}$ includes PCOR contributions from the interferometer optics and any constant offsets resulting, e.g., from the starting position of the scan $\zeta$. The linear dispersions coefficients $\tau_{part}$ and $\tau_{sys}$ correspond to the phase offsets $\gamma_{part}$ and $\gamma_{sys}$, respectively. The phase offsets $\gamma_{part}$, $\gamma_{sys}$ are evaluated at the nominal wavenumber $k_0$. The index of refraction n for air and is assumed to be independent of wavenumber. Those skilled in the art will appreciate that the teachings of the invention can be extended to denser transparent media than air by taking into account the wavenumber dependence of material index. All of the terms in Eq. 9, are potentially a function of field position x,y, although for the subsequent description, the variables n, $\zeta$, $k_0$ are assumed to be constant over the field of view.

In scanning interferometric measurements, light source 110 provides broadband radiation so that interference fringes are only produced when the optical path difference (OPD) between the reference and measurement legs are within the coherence length of the broadband radiation. Thus, scanning interferometric measurements can be considered a "coherence profiling" mode in that it uses the broadband nature of the interference effect, e.g., the localization of fringe contrast or equivalently, the measurement of the rate of change of interference phase with wavenumber.

Figure 2:
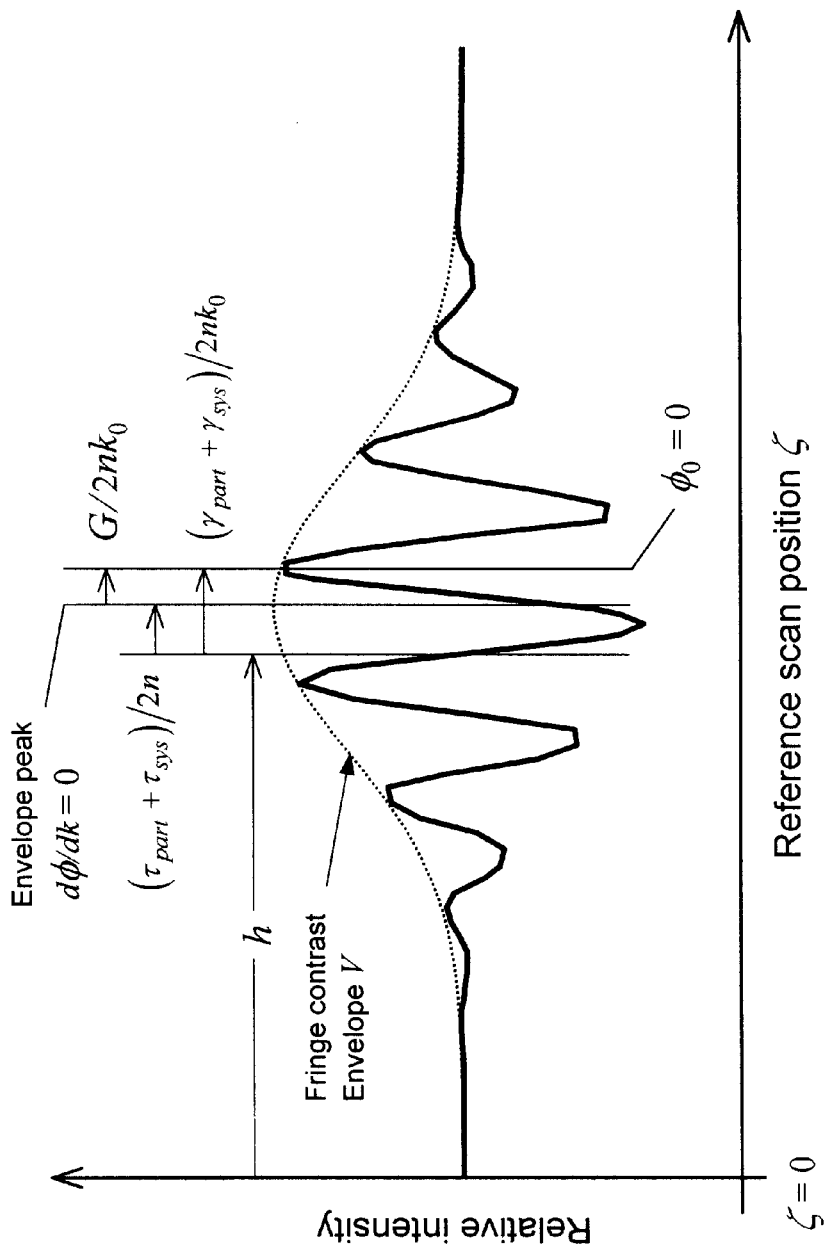
FIG. 2 is a graph illustrating interferometric coherence profiling data and the effects of PCOR and PCOR dispersion.

FIG. 2 shows an example of a coherence profiling intensity signal as the reference mirror position $\zeta$ is scanned. According to Eq. 1, the overlapping interference fringes for the various emissions of the broadband source result in a normalized intensity I given by $$I=1+V[h+(\tau_{sys}+\tau_{part})/2n-\zeta]\cos[2nk_0(h-\zeta)+\gamma_{part}+\gamma_{sys}] \quad (2)$$

where V is the fringe contrast envelope. The envelope V is proportional to the Fourier Transform of the spectral distribution of the light as detected by the cameras including the spectral sensitivity of the camera itself. In FIG. 2, it is assumed that the light source has a symmetric, approximately gaussian, spectral emission.

For a symmetric contrast envelope, the peak value of the fringe contrast envelope is given by the scan position for which dø/dk=0. This is the stationary phase position, where the interference phase is the same independent of wave number, and all of the interference patterns add up constructively. More generally, it can be shown that the stationary phase condition dø/dk=0 corresponds to the centroid of the fringe contrast envelope V. The phase gap G between the stationary phase position and the nearest zero phase point ø=0 position is given by $$G = (\gamma_{part} + \gamma_{sys}) - k_0(\tau_{sys} + \tau_{part}). \quad (3)$$

This is a constant phase offset, independent of wavenumber k, but dependent on the system and part parameters. The phase $\varnothing_0$ is the phase at the nominal wavenumber $k_0$ (with respect to a $\zeta=0$ scan position), e.g., from Eq. (1) we have $$\varnothing_0 = 2nk_0h + (\gamma_{part} + \gamma_{sys}). \quad (4)$$

From Eq. 2 and FIG. 2, it can be seen that the maximum or peak fringe contrast occurs at the scan position $\zeta = h + (\tau_{sys} + \tau_{part})/2n$. Thus, in one data processing embodiment, the system determines the fringe-contrast envelope V as a function of $\zeta$, e.g., by electronic or digital conversion, for every camera pixel. It then determines the scan position $\zeta_{max}$ for which the envelope V reaches a specific value, e.g., its maximum or peak value. The corresponding height h is this scan position minus the dispersion offset:

$$h = \zeta_{max} - (\tau_{sys} - \tau_{part})/2n. \quad (5)$$

In another signal processing method, the coherence profiling intensity signal is Fourier transformed with respect to the scan position $\zeta$ into the frequency domain (i.e., with respect to frequency wave number k). The phase of the transformed data corresponds directly to the phase ø(k) in Eq. 1. From this phase, the signal processor calculates the phase derivative dø/dk, and determines height h for each camera pixel according to:

$$h = \frac{1}{2n} \frac{d\phi}{dk} (\tau_{sys} - \tau_{part})/2n \quad (6)$$

where the derivative dø/dk is calculated for; $\zeta=0$. Eq. 6 follows directly from Eq. 1.

From Eqs. (5) and (6), one sees that surface height measurements based on coherence profiling data can be more accurately calculated by accounting, e.g., by calibration, for PCOR dispersion for the interferometry system and the test part (e.g. $\tau_{part}$ and $\tau_{sys}$).

In addition to coherence profiling, surface height measurements can also be based on interferometric phase profiling data where the interferometric phase ø(k) is measured directly for one or more wavenumbers k. For example, phase shifting interferometry (PSI) techniques can be used for such measurements. From Eq. 1, it is clear that if direct interferometric phase measurements are used to determine height h, accounting for PCOR $\gamma_{part}$ and $\gamma_{sys}$ (and PCOR dispersion $\tau_{part}$ and $\tau_{sys}$ for wave numbers other than the nominal wave number $k_0$) improves the accuracy of the height measurement.

Generally, the sensitivities to particular noise sources for coherence profiling measurements differ from those for phase profiling measurements, thus a particular technique may be preferable for a particular application, or they may be used to complement one another. One drawback of many phase profiling measurements, however, is the measured phase ø(k) includes $2\pi$ fringe ambiguity. For relatively smooth surfaces, relative fringe ambiguity over the surface may be interpolated from the data of multiple camera pixels using standard fringe unwrapping procedures. More generally, however, it is preferable to have an independent measurement, such as coherence profiling data, to remove such fringe ambiguity. Thus, to obtain absolute surface profile measurements, the coherence profiling height measurement can be used alone, or it can be used to remove the absolute fringe ambiguity from the phase profiling measurement, which may be more accurate than the coherence measurement in some cases.

In one such embodiment, the height h determined from a coherence profiling measurement is used to calculate an absolute phase profiling height measurement h' based on phase profiling data for the phase $\varnothing_0 = \varnothing(k_0)$ according to:

$$h' = \frac{1}{2nk_0}\left\{(\phi_0 - \gamma_{part} - \gamma_{sys}) - 2\pi Int\left[\frac{(\phi_0 - \gamma_{part} - \gamma_{sys}) - (2k_0 nh)}{2\pi}\right]\right\} \quad (7)$$

where Int [ ] returns the nearest integer to its argument. Eq. 7 can be applied independently to every point x,y on the part surface. Again, as is apparent from Eq. 7, accounting for PCOR $\gamma_{part}$ and $\gamma_{sys}$ improves the accuracy of the absolute phase profiling measurement. Moreover, Eq. 7 implicitly depends on PCOR dispersion values $\tau_{part}$ and $\tau_{sys}$ through the coherence profiling determination of h.

Figure 3:
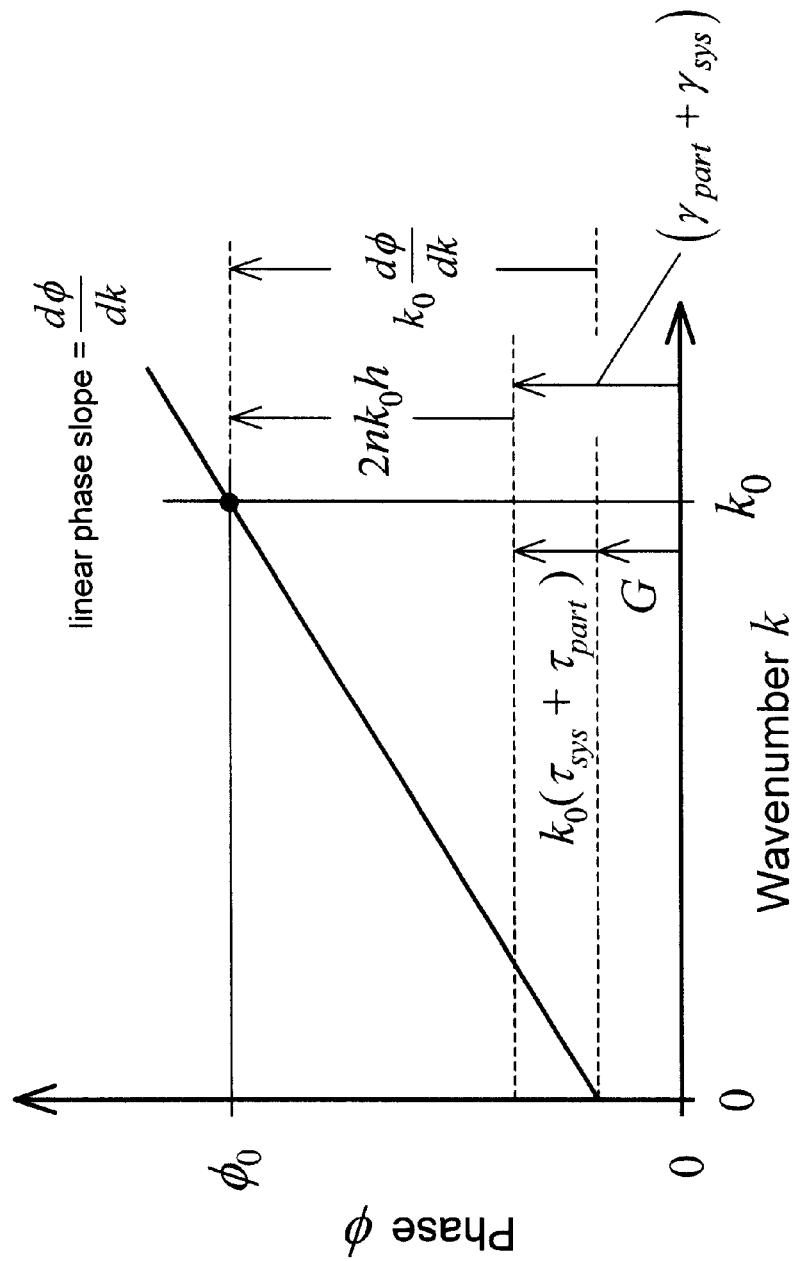
FIG. 3 is a graph of interferometric phase as a function of wave number to illustrate to the effects of PCOR and PCOR dispersion.

FIG. 3 shows graphically how the frequency transformed coherence profiling data ø(k) removes fringe ambiguity from a phase profiling measurement. The line dø/dk showing the rate of change of phase is evaluated by taking a few phase data points about $\varnothing_0$. The line removes the fringe-order ambiguity, provided we know the phase-axis intercept point G for the line according to Eq. 3. The evaluation is for a reference scan position $\zeta=0$, although the raw data for determining phase and phase derivative data require a scan such as that shown in FIG. 2. Note that in this graph, the gap G is the phase-axis intercept point, i.e., the phase at zero wavenumber.

Figure 4:
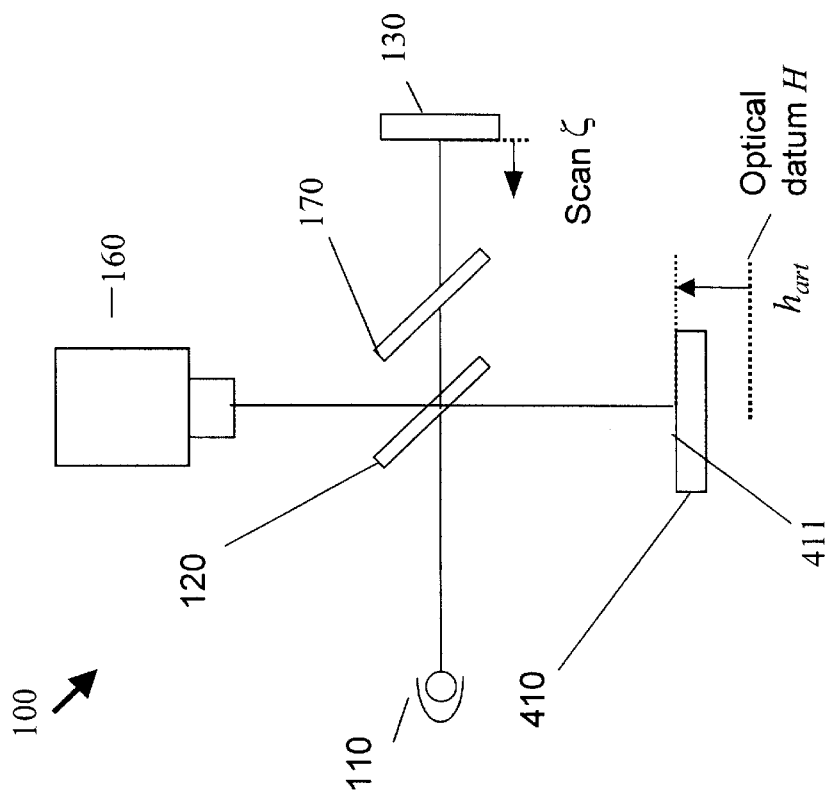
FIG. 4 is a schematic drawing of a system calibration for the height scanning interferometer.

To make use of the expressions above for calculating absolute height measurements, values for PCOR and PCOR dispersion are determined for the system and the part. The procedure that establishes $\gamma_{sys}$, $\tau_{sys}$ is a system characterization. System characterization also establishes implicitly the location and shape of the optical profiler datum H. System characterization involves a characterization artifact having known optical properties $\gamma_{art}$, $\tau_{art}$ and surface form $h_{art}$. Referring to FIG. 4, the artifact 410 is inserted temporarily in the field of view of interferometer 100 and a measurement of the x,y-dependent phase profile $\varnothing_0$ of the artifact surface 411 provides the necessary information for determining the system phase offset $\gamma_{sys}$:

$$\gamma_{sys} = \phi_0 - \gamma_{art} - 2nk_0 h_{art}, \quad (8)$$

where it is understood that all values potentially have an x,y field dependence. Note that the phase profile $\varnothing_0$ must be unwrapped, meaning that $2\pi$ fringe jumps must be removed under the assumption that the artifact is a continuous surface.

The procedure defined by Eq. (8) effectively locates the optical profiler datum H to the surface of origin of the pre-determined surface profile map $h_{art}$. Thus, for example, if the artifact is known to be perfectly flat, we can set $h_{art}=0$ for all x,y and the optical profiler datum H is defined as a plane coincident with the surface of the characterization artifact. Any tip/tilt or unaccounted-for surface profile information would in this case be incorporated into the system phase offset $\gamma_{sys}$.

Once the $\gamma_{sys}$ is known, the value of $\tau_{sys}$ can be determined as $$\tau_{sys}=(\gamma_{art}+\gamma_{sys}-G_{ex})/k_0-\tau_{art} \quad (9)$$

where $G_{ex}$ is the experimentally-observed phase gap (see FIG. 3):

$$G_{ex} = \phi_0 - k_0 \frac{d\phi}{dk}\bigg|_{\zeta=0} \quad (10)$$

Here again, all of the values with the exception of n and $k_0$ are expected to have an x,y field dependence related to optical distortions such as chromatic and spherical aberrations. There may also be a dependence on the tip and tilt of the part, which if it is substantial, will have to be recorded and used in the remaining calculations in much the same way as the x,y field dependence.

It is not necessary to preserve the overall tip, tilt and piston of the system parameters $\gamma_{sys}$, $\tau_{sys}$, which are partly a function of the location and orientation of the characterization artifact itself. Thus it is permitted to subtract common tip, tilt and piston terms from the field-dependent $\gamma_{sys}$, $\tau_{sys}$ data, as long as it is done in exactly the same manner for both $\gamma_{sys}$, $\tau_{sys}$, so as to preserve the relationship between these terms. This is effected by first removing tip/tilt from $\gamma_{sys}$, then recalculating $\tau_{sys}$ using Eq. (9). Adjusting the tip, tilt and piston of the system parameters is equivalent to adjusting the tip, tilt and piston of the optical profiler datum H.

We have several options for a characterization artifact. The simplest is an uncoated glass part or other pure dielectric. In this case, we know with great certainty that $\gamma_{art}=0$ and (apart from tip and tilt) $\tau_{art}=0$ for all x,y. Then assuming that the artifact has the exact same shape as the optical profiler datum we wish to establish, we have simply $\gamma_{sys}=\phi_0$ (flat dielectric artifact) and $\tau_{sys}=G_{ex}$ (dielectric artifact). Note that the former expression defines the location and shape of the optical datum H to be identical to the location and surface shape of the dielectric artifact itself.

If the artifact is sufficiently transparent, it can remain in the measurement path as a permanent part of the system. To characterize the system, the reference mirror scans to a position for which the partial surface reflection of the transparent artifact generates interference. To measure the test part, the reference mirror is scanned to a position for which the interference effects from the transparent artifact have nearly zero contrast. In this case, care must be taken to accommodate the difference between the phase change on reflection and on the phase change on transmission for the characterization surface.

Part PCOR values $\gamma_{part}$ can be calculated from well-established physics principles governing reflection from an interface (e.g., the Fresnal equations) and tabulated values for the complex refractive index n+ik of the part material. The part PCOR dispersion value $\tau_{part}$ can be determined in a manner similar to the system characterization using the experimentally observed phase gap $G_{ex}$ and known values for $\gamma_{part}$ and $\tau_{sys}$:

$$\tau_{part}=(\gamma_{part}-G_{ex})/2nk_0-\tau_{sys} \quad (11)$$

For most pure materials, we expect the height offset $\tau_{part}/2n$ to be of the same order of magnitude as $\gamma_{part}/2nk_0$ and to have the same sign. An alternative method for determining $\tau_{part}$ is to calculate the dispersion of calculated PCOR values using tabulated values of n+ik as a function of wavelength.

Table 1 provides several examples of height offsets related to the optical properties of part materials, calculate in part from tabulated n+ik data found in the *Handbook of Optical Constants of Solids*, E. D. Palik, Ed. (Academic Press, Inc., Orlando, 1985). The height offsets $\tau_{part}/2n$ and $\gamma_{part}/2nk_0$ can be even more significant for objects coated with thin films, as is shown in Table 2. These examples illustrate the importance of incorporating the optical properties of the object material when calculating surface profile, orientation and position with respect to a fixed datum.

TABLE 1

Example optical properties of object part materials at a wavelength of 0.5 microns.

| Material | Refractive index | PCOR $\gamma_{part}/2nk_0$ | Dispersion $\tau_{part}/2n$ |
|---|---|---|---|
| Glass | 1.5 | 0 nm | 0 nm |
| Aluminum | 0.8 + 6.2I | 13 nm | 13 nm |
| Gold | 0.916 + 1.84I | 57 nm | 34 nm |

TABLE 2

Example optical properties of thin-film aluminum oxide on aluminum at a wavelength of 0.5 microns.

| $AlO_2$ Film thickness | PCOR $\gamma_{part}/2nk_0$ | Dispersion $\tau_{part}/2n$ |
|---|---|---|
| 0 nm | 13 nm | 9 nm |
| 25 nm | 43 nm | 49 nm |
| 75 nm | −87 nm | 221 nm |

For some embodiments, it is desired for interferometer 100 to determine only the relative profile of the part surface, and not also the position and orientation of the part surface. According to the coherence profiling results of Eqs. (5) and (6), however, variations in the materials comprising the test surface will cause local variations in $\tau_{part}$ and therefore variations in the calculated height h. Thus, even if $\tau_{sys}$ can be assumed to be constant over the field of view (FOV), accurate measurements of relative surface profile still need to account for $\tau_{part}$. This provides accurate measurements in coherence profiling mode, even when the PCOR dispersion of the part surface varies from location to location. Of course, Eqs. (5) and (6) can also be used when $\tau_{sys}$ is not constant over the field of view (FOV) to improve relative height measurements. Similarly, the accuracy of relative phase profiling measurements can be improved by taking into account local variations in $\gamma_{part}$ and $\gamma_{sys}$ in Eq. (7), and local variations in $\tau_{part}$ and $\tau_{sys}$ when determining fringe order from the coherence profiling result for local surface height h. Thus, embodiments of the invention accommodate dissimilar materials in coherence and phase profiling modes, even when the optical properties of the part surface, including the PCOR dispersion, varies from location to location.

In other embodiments, the invention extends height-scanning interferometry to those metrology problems for which the absolute position and orientation of the surface is as important as the surface texture and profile. Notably, in all of the equations above, the height results are referenced to a datum H. This datum may be a plane or have any other useful structure. Using the methods disclosed herein, all of the dominant optical properties of the system and of the object part are characterized so that the resulting height measurements all refer to the same datum H. Thus in addition to surface profile one can determine the tip, tilt and distance of the object part surface with respect to a fixed coordinate system.

As described above, the system characterization effectively establishes an internal, virtual optical profiler datum H to which all the measurements are referenced. However, the exact location of H in space may drift in angle and position over time, for example as a consequence of thermal expansion and contraction of the various optical and mechanical components that make up the apparatus. It is therefore useful to have a procedure for determining the current position and orientation of H with respect to specific locations in space. The process of measuring the location and orientation of the optical datum H with respect to mechanical reference points in space is referred to herein as initialization.

The purpose of the initialization therefore is to monitor the location of the profiler datum H with respect to a physical plane in space provided by, e.g., an initialization artifact. In the following example, the datum H is assumed to be a plane, although other datum surfaces are possible, including stepped structures, spheres and cylinders. Further, it will also be assumed that the initialization artifact is a dielectric having zero PCOR, zero PCOR dispersion and the identical shape of the optical datum plane H. The more (general case would involve correction terms similar to those appearing in Eqs. (8) and (9).

Figure 5:
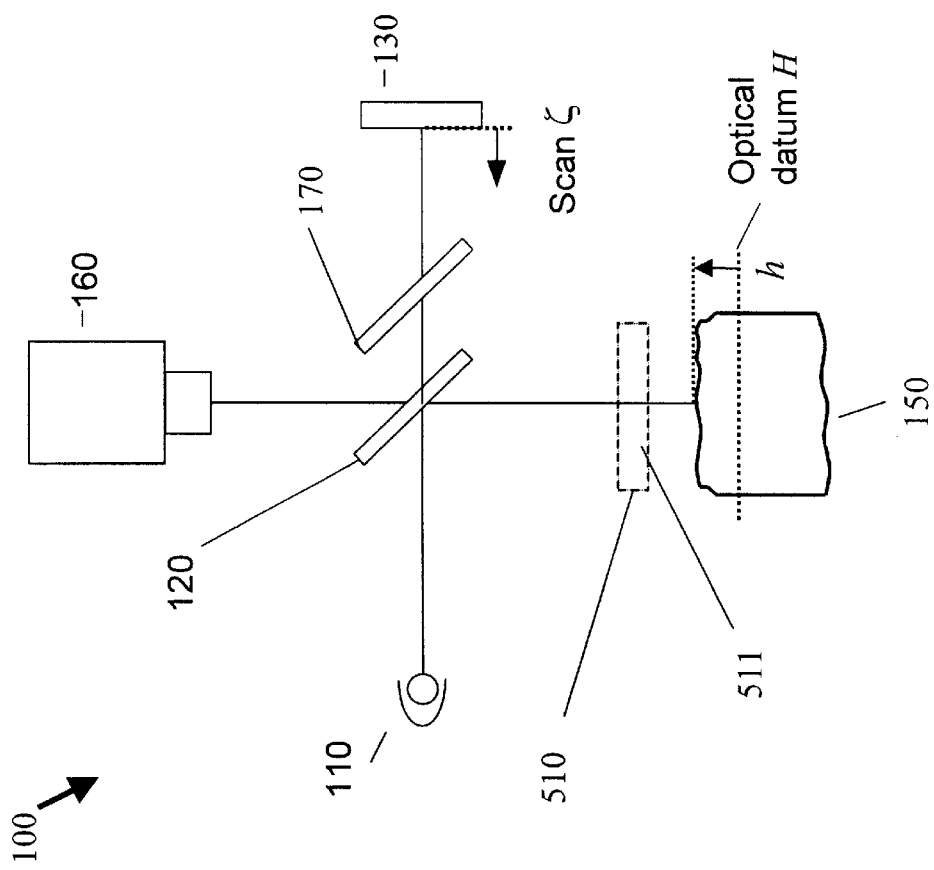
FIG. 5 is a schematic drawing of a system initialization for the height scanning interferometer.

Referring to FIG. 5, a surface 511 of an initialization artifact 510 is scanned and then the data processor fits a plane to the surface profile and calculates average height D and orientation angles $\alpha$, $\beta$ for the initialization artifact with respect to the optical datum H. In this way, the location and orientation of the datum H is now known with respect to a real object in space. The initialization artifact may now be removed, or if it is transparent or only partially obscuring, could remain in the field of view during subsequent measurements.

Having established the position of the optical profiler datum H, subsequent part measurements may be referenced to the original position of the initialization artifact using the following formula:

$$\hat{h} = h - D - x\tan(\alpha) - y\tan(\beta), \qquad (12)$$

where $\hat{h}$ is the height of a point on the part surface with respect to the initialization artifact.

Note that if we chose to perform the initialization simultaneously with the system characterization, using the same artifact and possibly even the identical interference data, the values of $\alpha$, $\beta$ are identical to those generated by the optional tip/tilt removal step during system characterization.

Figure 6:
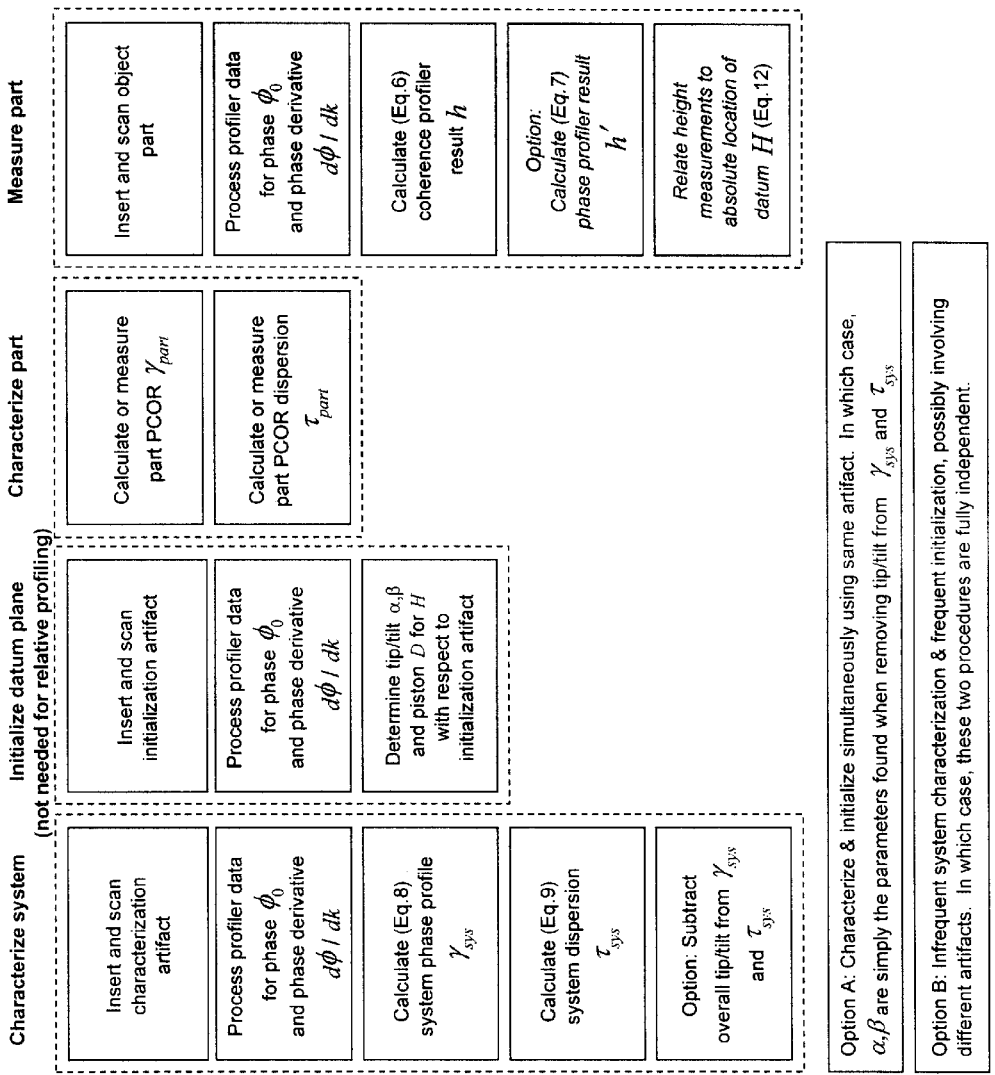
FIG. 6 is a flow chart summarizing system characterization and initialization and part characterization and measurement.

FIG. 6 is a flow chart summarizing the system characterization, system initialization, part characterization, and part measurement steps described above.

For phase profiling, another data processing approach that may be more robust for certain types of measurements on continuous surfaces relies on a standard fringe unwrapping procedure for the measured phase $\phi$ followed by a global evaluation of the fringe order. In a first step, the data processor estimates the interference phase $\phi$ everywhere in the field of view, and then creates an unwrapped or connected height map h" using traditional techniques from phase-shifting interferometry. The fringe order for this unwrapped height map is then $$m = Int\left\{\frac{\langle h'' \rangle - \langle h \rangle}{\lambda/2}\right\} \qquad (13)$$

where $\lambda$ is the wavelength, the brackets < > denote average over all pixels in a field of view region. The final height is then $$h''' = h'' - m\lambda/2 \qquad (14).$$

This alternative algorithm may be the best approach if the surface is sufficiently smooth and continuous, and therefore not likely to generate discontinuities during the phase unwrapping procedure. For more complex surface structures, Eq. (13) can be applied on a region by region basis.

We note that many of the equations above assume that phase evaluations take place at the nominal wavenumber $k_0$, and that the system and part parameters also are evaluated at the same fixed $k_0$. The value for $k_0$ is selected by identifying the peak or mean wavenumber $\overline{k}$ for the Fourier spectrum observed in the experimental data during system characterization. In an alternative embodiment, however, the data processor can select an optimized value $\overline{k}$ for the phase-evaluation wavenumber on a pixel by pixel basis, updated every measurement, always selecting the value for which the signal is strongest. For example, for the phase profiling measurements, we can have:

$$\phi(\overline{k}) = 2n\overline{k}(h-\zeta) + \gamma_{part} + (\overline{k}-k_0)(\tau_{sys} + \tau_{part}) \qquad (15)$$

or equivalently $$\phi(\overline{k}) = \overline{k}[2nh + (\tau_{sys} + \tau_{part})] + G \qquad (16)$$

These equations show that a variable wavenumber is possible provided that we incorporate explicitly the linear dispersion factors $\tau_{sys}$, $\tau_{part}$, which are evaluated with respect to $k_0$. We therefore have the option, in an alternative embodiment, of using an inverted form of Eq. (16) in place of Eq. (7), in which case the phase may be evaluated at any convenient wavenumber.

The data processing procedures described above can be applied to a large range of interferometry systems and particularly, to any height scanning interferometers. For example, the light source in the interferometer may be any of: an incandescent source, such as a halogen bulb or metal halide lamp, with or without spectral bandpass filters; a broadband laser diode; a light-emitting diode; a combination of several light sources of the same or different types; an arc lamp; any source in the visible spectral region; any source in the IR spectral region, particularly for viewing rough surfaces & applying phase profiling; any source in the UV spectral region, particularly for enhanced lateral resolution; and any source or combination of sources having a net spectral bandwidth broader than 0.1% of the mean wavelength. Furthermore, the scanning system may be: driven by any of a piezo-electric device, a stepper motor, and a voice coil; implemented opto-mechanically or opto-electronically rather than by pure translation (e.g., by using any of liquid crystals, electro-optic effects, strained fibers, and rotating waveplates); any of a driver with a flexure mount and any driver with a mechanical stage, e.g. roller bearings or air bearings. Also, the interferometer optics may form any of: an interferometric microscope employing, e.g., a Mirau or Michelson objective lens; a Twyman Green system; a Fizeau interferometer employing a filtered or structured source spectrum so as to provide coherence peaks far from zero OPD; a fiber interferometer; and a Mach Zehnder, particularly for profiling transparent media. Finally, the data analysis may involve any of: frequency domain analysis (FDA); peak-fringe analysis; dynamic filtering to extract the fringe visibility in real time; a least-squares technique to extract fringe visibility and phase at the same time; and fringe visibility analysis followed by phase analysis, potentially including a separate measurement for phase with a modified source spectrum.

The analysis steps described above can be implemented in computer programs using standard programming techniques. Such programs are designed to execute on programmable computers each comprising an electronic processor, a data storage system (including memory and/or storage elements), at least one input device, and least one output device, such as a display or printer. The program code is applied to input data (e.g., images from the camera) to perform the functions described herein and generate output information (e.g., surface profiles), which is applied to one or more output devices. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the analysis described herein.

Other aspects, advantages, and modifications are within the scope of the following claims.

What is claimed is:

1. A surface profiling method for determining the relative positions of multiple points on an object surface including multiple surface materials, the method comprising:
    collecting interferometric data related to the relative positions; and
    calculating the relative positions based on the collected interferometric data and at least one value indicative of dispersion in the phase change on reflection (PCOR) for each of the surface materials.

2. A surface profiling method for determining the relative positions of multiple points on an object surface including multiple surface materials, the method comprising:
    collecting interferometric data related to the relative positions; and
    calculating the relative positions based on the collected interferometric data and at least one value indicative of the phase change on reflection (PCOR) $\gamma_{part}$ for each of the surface materials.

3. A surface profiling method for determining the absolute position with respect to a common datum surface of each of multiple points on an object surface, the method comprising:
    collecting interferometric data related to the absolute positions; and
    calculating the absolute positions based on the collected interferometric data and at least one value indicative of dispersion in the phase change on reflection (PCOR) of the object surface and dispersion in the phase change on reflection (PCOR) of an interferometry system used to collect the interferometric data.

4. A surface profiling method for determining the absolute position with respect to a common datum surface of each of multiple points on an object surface, the method comprising:
    collecting interferometric data related to the absolute positions; and
    calculating the absolute positions based on the collected interferometric data and at least one value indicative of the phase change on reflection (PCOR) of the object surface $\gamma_{part}$ and the phase change on reflection (PCOR) of an interferometry system used to collect the interferometric data $\gamma_{sys}$.

5. A surface profiling method comprising:
    collecting interferometric data related to a surface profile of a measurement object; and
    calculating the surface profile based on the collected interferometric data and at least one value indicative of dispersion in the phase change on reflection (PCOR) of the profiled surface of the measurement object.

6. The method of claim 5, wherein the calculation of the surface profile is based on the collected interferometric data and multiple values indicative of dispersion in the phase change on reflection (PCOR) of different regions of the profiled surface of the measurement object.

7. The method of claim 5, wherein the calculation of the surface profile is based on the collected interferometric data and at least one value indicative of dispersion in the phase change on reflection (PCOR) of the profiled surface of the measurement object and dispersion in the phase change on reflection (PCOR) of an interferometry system used to collect the interferometric data.

8. The method of claim 5, wherein the collection of interferometric data comprises collecting scanning interferometric data related to the surface profile of the measurement object.

9. The method of claim 5 wherein the collected interferometric data comprises at least one phase value ø(k) at a wavevector k for each of multiple points on the profiled surface, and wherein the calculation of the surface profile is based on the relationship $$\phi(k) = 2nk(h-\zeta) + (\gamma_{part} + \gamma_{sys}) + (\tau_{part} + \tau_{sys})(k - k_0)$$

where h is the surface height, $\zeta$ is a reference offset position, n is a refractive index, $\gamma_{part}$ is the phase change on reflection (PCOR) of the profiled surface at the wavevector k, $\gamma_{sys}$ is the phase change on reflection (PCOR) of an interferometry system used to collect the interferometric data at the wavevector k, $\tau_{part}$ is the linear dispersion of the phase change on reflection (PCOR) of the profiled surface with respect to a reference wavevector $k_0$, and $\tau_{sys}$ is the linear dispersion of the phase change on reflection (PCOR) of the interferometry system with respect to wavevector $k_0$.

10. The method of claim 5, wherein the collected interferometric data comprises multiple phase values ø(k) corresponding to multiple wavevector values k for each of multiple points on the profiled surface, and wherein the calculation of the surface profile is based on the relationship $$\frac{\partial \phi(k)}{\partial k} = 2n(h - \zeta) + (\tau_{part} + \tau_{sys})$$

where h is the surface height, $\zeta$ is a reference offset position, n is a refractive index, $\tau_{part}$ is the linear dispersion of the phase change on reflection (PCOR) of the profiled surface with respect to a reference wavevector $k_0$, and $\tau_{sys}$ is the linear dispersion of the phase change on reflection (PCOR) of an interferometry system used to collect the interferometric data with respect to the reference wavevector $k_0$.

11. The method of claim 5, wherein the interferometric data is scanning interferometric data comprising multiple phase values ø($\zeta$) corresponding to multiple positions $\zeta$ of a scanning reference mirror for each of multiple points on the profiled surface, and the calculation of the surface profile comprises transforming the multiple phase values for each point into a wavevector domain, calculating a derivative of the transformed phase values for each point with respect to wavevector, and calculating the surface profile from the derivative for each point and the at least one value indicative of dispersion in the phase change on reflection (PCOR) of the profiled surface of the measurement object.

12. The method of claim 11, wherein the at least one value is indicative of the dispersion in the phase change on reflection (PCOR) of the profiled surface of the measurement object and the dispersion in the phase change on reflection (PCOR) of a scanning interferometry system used to collect the interferometric data, and the calculated surface profile provides an absolute position with respect to a common datum surface for each of the multiple points on the profiled surface.

13. The method of claim 5, wherein the interferometric data comprises coherence profiling data and phase profiling data, and wherein the calculation of the surface profile comprises using the coherence profiling data and the at least one value indicative of the dispersion in the phase change on reflection (PCOR) to determine an initial estimate of the surface profile, and using the initial estimate to resolve fringe ambiguity in the phase profiling data.

14. The method of claim 5, wherein the at least one value is $\tau_{part}+\tau_{sys}$, where $\tau_{part}$ is the linear dispersion of the phase change on reflection (PCOR) of the profiled surface with respect to a reference wavevector $k_0$, and $\tau_{sys}$ is the linear dispersion of the phase change on reflection (PCOR) of an interferometry system used to collect the interferometric data with respect to the reference wavevector $k_0$.

15. The method of claim 5, wherein the at least one value comprises $\tau_{part}$ and $\tau_{sys}$, where $\tau_{part}$ is the linear dispersion of the phase change on reflection (PCOR) of the profiled surface with respect to a reference wavevector $k_0$, and $\tau_{sys}$ is the linear dispersion of the phase change on reflection (PCOR) of an interferometry system used to collect the interferometric data with respect to the reference wavevector $k_0$.

16. The method of claim 15, wherein the at least one value further comprises $\gamma_{part}$ and $\gamma_{sys}$, where $\gamma_{part}$ is the phase change on reflection (PCOR) of the profiled surface at a particular wavevector k, and $\gamma_{sys}$ is the phase change on reflection (PCOR) of the interferometry system at the wavevector k.

17. The method of claim 5, wherein the at least one value comprises a first value indicative of the dispersion in the phase change on reflection (PCOR) of the profiled surface and a second value indicative of a phase change on reflection (PCOR) of the profiled surface for a particular wavevector k.

18. The method of claim 5, wherein the calculated surface profile provides an absolute position with respect to a common datum surface of each of multiple points on the profiled surface.

19. The method of claim 5, wherein the collected interferometric data comprises coherence profiling intensity data as a function of a reference mirror scan position $\zeta$, wherein the calculation of the surface profile is based on the relationship $$h=\zeta_{max}-(\tau_{sys}-\tau_{part})/2n$$

where h is the surface height, $\zeta_{max}$ is the reference scan position where the intensity data is maximized, n is a refractive index, $\tau_{part}$ is the linear dispersion of the phase change on reflection (PCOR) of the profiled surface with respect to a reference wavevector $k_0$, and $\tau_{sys}$ is the linear dispersion of the phase change on reflection (PCOR) of an interferometry system used to collect the interferometric data with respect to the reference wavevector $k_0$.

20. A surface profiling system comprising:
an interferometry system which during operation provides interferometric data related to a surface profile of a measurement object; and
an electronic processor coupled the interferometry system, wherein during operation the electronic processor calculates the surface profile based on the interferometric data and at least one parameter indicative of dispersion in the phase change on reflection (PCOR) of the profiled surface of the measurement object.

21. The surface profiling system of claim 20, wherein the at least one parameter is indicative of dispersion in the phase change on reflection (PCOR) of the profiled surface of the measurement object and dispersion in the phase change on reflection (PCOR) of the interferometry system, and wherein the surface profile calculated by the electronic processor comprises an absolute position with respect to a common datum surface of each of multiple points on the profiled surface.

22. The surface profiling system of claim 20, wherein during operation the electronic processor calculates the surface profile based on the interferometric data and parameters indicative of dispersion in the phase change on reflection (PCOR) of different surface materials of the profiled surface.

23. The surface profiling system of claim 20, wherein the interferometry system comprises:
a broadband source;
a scanning interferometer which during operation directs a first wavefront derived from the source along a reference path and a second wavefront derived from the source along a measurement path contacting the measurement object, and, after the second wavefront contacts the measurement object, combines the wavefronts to produce an optical interference pattern;
a detector producing the interference data in response to the optical interference pattern; and
a scanning controller coupled to the interferometer and the detector, which during operation causes the scanning interferometer to vary the optical path difference between the reference and measurement paths.

24. A method for calibrating an interferometry system to determine at least one of the phase change on reflection (PCOR) of the interferometry system $\gamma_{sys}$ and linear dispersion of the phase change of reflection (PCOR) of the interferometry system $\tau_{sys}$ with respect to a reference wavevector $k_0$, the method comprising:
collecting interferometric data relating to a test surface using the interferometry system;
providing independent information for the profile h of the test surface, the phase change on reflection (PCOR) of the test surface $\gamma_{part}$, and the linear dispersion of the phase change on reflection (PCOR) of the test surface $\tau_{part}$ with respect to a reference wavevector $k_0$; and
calculating the at least one of the phase change on reflection (PCOR) of the interferometry system $\gamma_{sys}$ and the linear dispersion of the phase change of reflection (PCOR) of the interferometry system $\tau_{sys}$ based on the interferometric data and the independent information.

25. The method of claim 24, wherein the collected interferometric data comprises at least one phase value ø(k) at a wavevector k for each of multiple points on the test surface, and wherein the calculation of the surface profile is based on the relationship $$ø(k)=2nk(h-\zeta)+(\gamma_{part}+\gamma_{sys})-(\tau_{part}+\tau_{sys})(k-k_0)$$

where $\zeta$ is a reference offset position and n is a refractive index.

26. The method of claim 24, wherein the at least one of $\gamma_{sys}$ and $\tau_{sys}$ comprises $\gamma_{sys}$.

27. The method of claim 24, wherein the at least one of $\gamma_{sys}$ and $\tau_{sys}$ comprises $\tau_{sys}$.

28. The method of claim 24, wherein the at least one of $\gamma_{sys}$ and $\tau_{sys}$ comprises $\gamma_{sys}$ and $\tau_{sys}$, the interferometric data provides an experimentally observed phase gap $G_{ex}$, and the calculation of $\tau_{sys}$ is based on the relationship $$\tau_{sys} = [(\gamma_{part} + \gamma_{sys} - G_{ex})/k_0] - \tau_{part}.$$

29. A method for measuring at least one of the phase change on reflection (PCOR) of test material $\gamma_{part}$ and linear dispersion of the phase change of reflection (PCOR) of the test material $\tau_{part}$ with respect to a reference wavevector $k_0$, the method comprising:

collecting interferometric data relating to a test surface using an interferometry system;

providing independent information for the phase change on reflection (PCOR) of the interferometry system $\gamma_{sys}$ and the linear dispersion of the phase change on reflection (PCOR) of the interferometry system $\tau_{sys}$ with respect to a reference wavevector $k_0$; and calculating the at least one of the phase change on reflection (PCOR) of the test material $\gamma_{part}$ and the linear dispersion of the phase change of reflection (PCOR) of the test material $\tau_{part}$ based on the interferometric data and the independent information.

30. The method of claim 29, wherein the at least one of $\gamma_{part}$ and $\tau_{part}$ comprises $\tau_{part}$, the interferometric data provides an experimentally observed phase gap $G_{ex}$, and the calculation of $\tau_{part}$ is based on the relationship $$\tau_{part} = [(\gamma_{part} + \gamma_{sys} - G_{ex})/k_0] - \tau_{sys}.$$

* * * * *

UNITED STATES PATENT AND TRADEMARK OFFICE
CERTIFICATE OF CORRECTION

PATENT NO. : 6,597,460 B2
DATED : July 22, 2003
INVENTOR(S) : Leslie L. Deck et al.

It is certified that error appears in the above-identified patent and that said Letters Patent is hereby corrected as shown below:

Title page,
Item [*] Notice, replace "308 days" with -- 365 days --

Column 3,
Line 34, replace "he" with -- the --

Column 5,
Line 15, replace "γand" with -- $\gamma_{sys}$ and --

Column 6,
Line 24, after "2nk" delete ")"

Column 11,
Line 20, before "general" delete "("
Lines 37 and 39, replace "$h$" with -- $\hat{h}$ --
Line 63, replace "<>" with -- $\langle \rangle$ --

Column 13,
Line 4, insert -- at -- between "and" and "least"

Signed and Sealed this

Second Day of March, 2004

JON W. DUDAS
*Acting Director of the United States Patent and Trademark Office*